United States Patent [19]

Smithgall, Sr.

[11] 4,390,897
[45] Jun. 28, 1983

[54] TECHNIQUE FOR AUTOMATICALLY CENTERING A LIGHTGUIDE FIBER IN A COATING

[75] Inventor: David H. Smithgall, Sr., East Windsor Township, Mercer County, N.J.

[73] Assignee: Western Electric Company, Inc., New York, N.Y.

[21] Appl. No.: 255,077

[22] Filed: Apr. 17, 1981

[51] Int. Cl.³ .............................................. H04M 7/00
[52] U.S. Cl. .................................. 358/101; 356/73.1; 356/430; 427/10; 250/550
[58] Field of Search ................. 358/106, 101, 107, 93; 356/73.1, 430, 429, 107; 427/8, 10; 250/550, 574

[56] References Cited

U.S. PATENT DOCUMENTS

| | | | |
|---|---|---|---|
| 3,876,877 | 4/1975 | Meulensteen et al. | 250/222 |
| 3,982,816 | 9/1976 | Watkins | 356/103 |
| 3,999,856 | 12/1976 | Unterleitner | 356/107 |
| 4,042,723 | 8/1977 | Presby | 427/8 |
| 4,067,651 | 1/1978 | Watkins | 250/550 |
| 4,124,728 | 11/1978 | Marcuse et al. | 427/8 |
| 4,139,306 | 2/1979 | Morton | 358/106 |

OTHER PUBLICATIONS

B. R. Eichenbaum, "The Centering of Optical Fiber Coating by Monitoring Forward Scattering Patterns-Theory and Practice" *The Bell System Technical Journal*, vol. 59, No. 3, pp. 313 et seq., Mar. 1980.
H. M. Presley, "Geometrical Uniformity of Plastic Coatings on Optical Fibers" *The Bell System Technical Journal*, vol. 55, No. 10, pp. 1525-1537, Dec. 1976.

*Primary Examiner*—Marc E. Bookbinder
*Assistant Examiner*—Edward L. Coles
*Attorney, Agent, or Firm*—D. J. Kirk

[57] ABSTRACT

A technique for automatically centering a lightguide fiber (7) in a transparent plastic coating (6) having a refractive index lower than that of the fiber. The fiber (7) is passed through an applicator (14) having the coating material (6) therein to coat the fiber. Orthogonal laser beams (50 or 52) are directed at the coated fiber (5) resulting in first and second forward scattered light patterns (51 or 53) impinging on first and second screens (36 and 37). The patterns are monitored with a pair of CCTV cameras (38 and 39) and the video output signals therefrom are processed to determine the period ($P_1$ and $P_2$) of outboard interference fringes (61 and 62) of each pattern. The period of the interference fringes are compared to determine the difference therebetween which is proportional to the eccentricity of the fiber (7) within the coating. The position of the applicator (14) is then adjusted to center the lightguide fiber (7) in the coating (6).

9 Claims, 8 Drawing Figures

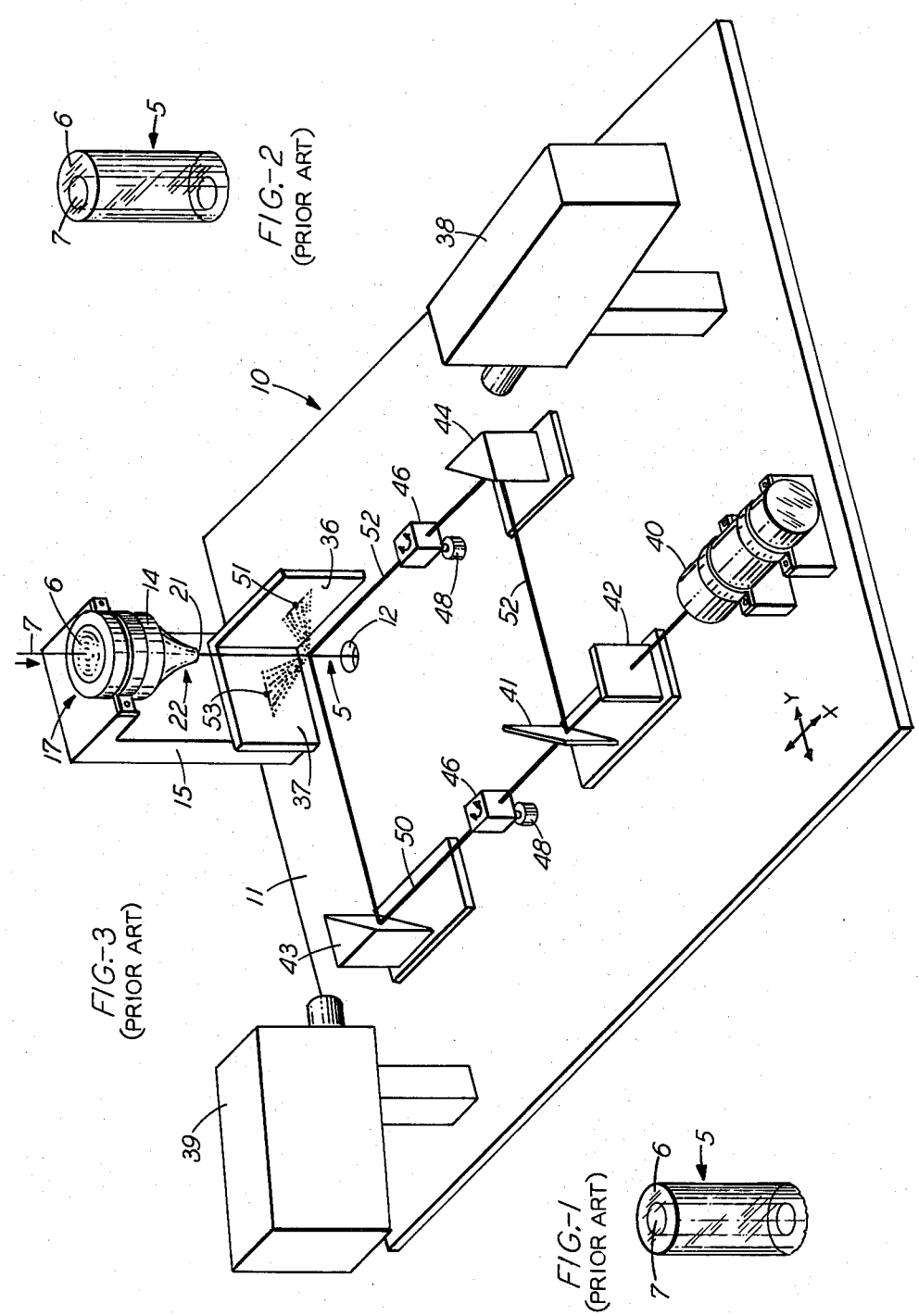

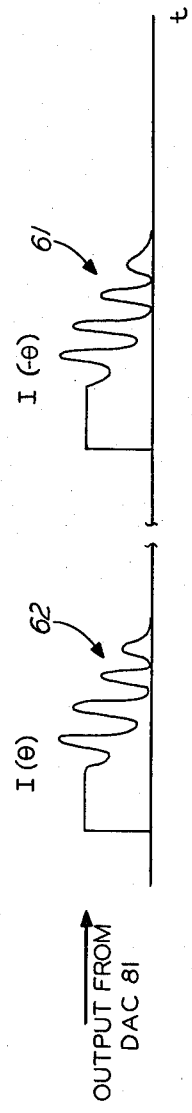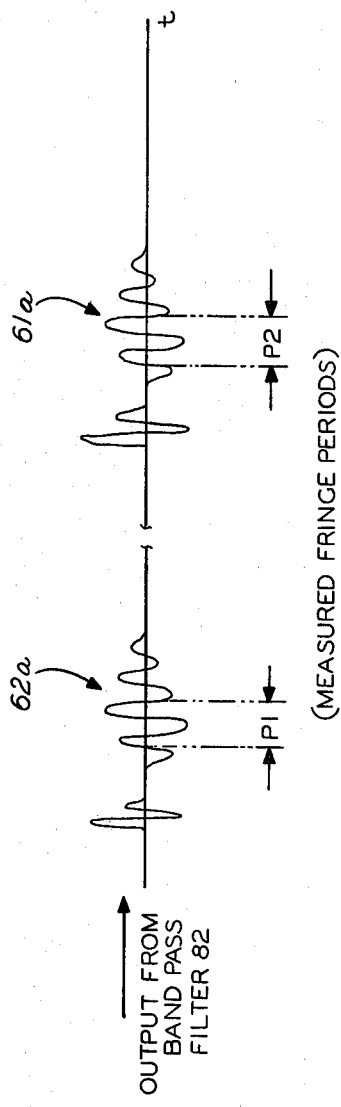

TECHNIQUE FOR AUTOMATICALLY CENTERING A LIGHTGUIDE FIBER IN A COATING

TECHNICAL FIELD

The instant invention relates to the fabrication of lightguide fiber having a transparent low index of refraction coating thereon. In particular, the invention is directed to a technique for automatically centering the fiber in the low index coating.

BACKGROUND OF THE INVENTION

It is most important to center a lightguide fiber within a protective plastic coating applied thereto in order to prevent degradation of the strength thereof. Such centering also eases the fabrication of connector arrays for splicing and provides maximum abrasion protection for a given coating material.

One method of accomplishing such centering is set forth in copending patent application Ser. No. 179,594 filed in the U.S. Patent and Trademark Office on Aug. 21, 1980, assigned to the instant assignee, now abandoned, which is hereby incorporated by reference. That application discloses a technique for automatically centering a lightguide fiber in a transparent plastic coating that has an index of refraction higher than that of the fiber material. The fiber is passed through an applicator having coating material therein to coat the fiber. Orthogonal beams of laser light are directed at the coated fiber resulting in first and second forward scattered light patterns impinging on first and second screens located proximate the fiber. The patterns are monitored by a pair of CCTV cameras and the video output signals therefrom are processed to determine the distance from a center peak reference to each of two prominent outboard peaks. The distances are compared to determine the coating eccentricity and a feedback signal is developed to automatically adjust the applicator to provide a uniform, concentric, coating on the fiber.

Such a technique has been found to be most effective when the coating material has an index of refraction higher than the fiber. However, when the index of refraction is lower than that of the fiber material the amplitude of the outboard peaks substantially decreases resulting in inaccurate measurements and adjustments to the applicator. Accordingly, there is a need for a technique for automatically centering a lightguide fiber in a coating material having a lower index of refraction than that of the fiber material.

SUMMARY OF THE INVENTION

The instant invention overcomes the foregoing problem of automatically centering a lightguide fiber in a light transmissive coating material having an index of refraction lower than that of the fiber. A light beam is directed at the coated fiber to cause a forward scattered light intensity pattern to impinge on a screen, the pattern having a high amplitude central peak and first and second outboard interference fringes. The scattered light pattern is monitored to determine the period of each of the first and second outboard interference fringes and the period of the first and second fringes are compared to determine the eccentricity of the fiber within the coating.

BRIEF DESCRIPTION OF THE DRAWINGS

FIGS. 1 and 2 show sections of coated lightguide fibers;

FIG. 3 is an isometric view of apparatus used to implement the instant invention;

FIG. 7 represents the signal output from a digital-to-analog converter located at the output of the microprocessor; and FIG. 8 is the output from a bandpass filter used to implement the instant invention.

DETAILED DESCRIPTION

Figure 4:
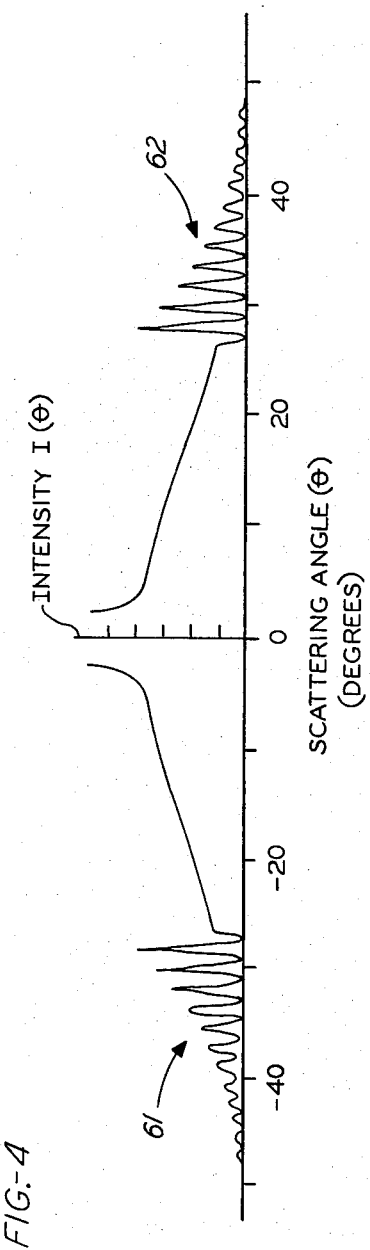
FIGS. 4 and 5 depict light intensity patterns which are forward scattered by coated fiber sections shown in FIGS. 1 and 2, respectively.

FIG. 1 depicts a section of a coated lightguide fiber 5 having a light transmissive coating 6 of uniform thickness with a lightguide fiber 7 coaxially centered therein while FIG. 2 represents a section of coated lightguide fiber wherein the thickness of the coating is non-uniform and the fiber is eccentrically located therein. As hereinbefore indicated it is most desirable to have the coaxially centered configuration shown in FIG. 1. The lightguide fiber 7, which may be fused silica, has a diameter of approximately 125 $\mu$m and the diameter of the coated lightguide fiber 5 is about 225 $\mu$m. The coating material is silicone or the like and has an index refraction which is lower than the lightguide fiber 7.

CENTERING APPARATUS

FIG. 3 is an isometric view of exemplary apparatus 10 used to center the lightguide fiber 7 in the coating 6. The apparatus 10 is disclosed in the aforementioned copending patent application and is comprised of a movable baseplate 11 having an opening 12 therein. A coating applicator 14 is fixedly mounted on a support member 15 which is secured to the baseplate 11. The applicator 14 contains the coating material 6 and is open at a first end 17 and has an apertured, conical-shaped tip 21 at the opposite end 22. A lightguide fiber 7 is shown passing axially through the applicator 14 and the apertured tip 21 to apply the coating material 6 thereto. The coated fiber 5 then passes through the opening 12 in the base 11 to a take-up reel (not shown).

The apparatus 10 is further comprised of first and second slightly diffuse viewing screens 36 and 37, respectively, first and second closed circuit television (CCTV) cameras 38 and 39, respectively, a 1 mW He Ne laser 40, a beam splitter 41, a neutral density filter 42, first and second reflectors 43 and 44, respectively, and a pair of rotatable cubes 46—46 operable under control of motors 48—48. The screens 36 and 37 are located approximately four centimeters from the coated fiber 5.

The fiber 7 emerges from the conical-shaped tip 21 and into the opening 12 as the coated lightguide fiber 5. The laser 40 generates a beam 50 which passes through the neutral density filter 42. A portion of the beam 50 passes through the beam splitter 41 and the cube 46 and is redirected by the reflector 43 onto the coated fiber 5 resulting in a first forward scattered light pattern 51 impinging on the screen 36. The cube 46 is rotatable under the control of the motor 48 to center the laser beam 50 upon the coated fiber 5, maximizing the pattern symmetry and the brightness of the forward scattered light intensity pattern 51.

In a similar fashion a portion of the beam 50 is reflected by the beam splitter 41, as beam 52 and further reflected by the reflector 44 through the cube 46, onto the coated lightguide fiber 5 to form a second forward scattered light intensity pattern 53 on the screen 37, the beams 50 and 52 being of approximately equal intensity.

The forward scattered light patterns 51 and 53 will take the form of a substantially horizontal line of varying light intensity along its length. A high light intensity central portion of the pattern represents the position of the laser beams 50 or 52. The outboard portion or wings of the pattern have lower intensity fringe portions which will hereinafter be discussed in detail. The first camera 38 monitors the forward scattered light pattern 53 along the y axis while the second camera 39 monitors the forward scattered light pattern 51 along the x axis.

Alternatively, the screens 36 and 37 may be made of light transmissive, translucent, material and the cameras 38 and 39 view the screens from the opposite side. Such an arrangement facilitates the positioning of the cameras 38 and 39 and admits of a smaller packaging arrangement.

Preferably, the cameras 38 and 39 are rotated 90° about their optical axes so as to vertically raster scan the scattered patterns 51 and 53, respectively. Such a scanning technique is described in detail in U.S. Pat. No. 4,195,791 which issued on Apr. 1, 1980 and is assigned to the instant assignee, and which is incorporated by reference herein. This technique provides substantially improved resolution, particularly when scanning relatively thin horizontal images.

FIG. 4 is the envelope of the video output of the CCTV camera 38 or 39 which represents the forward scattered light intensity pattern 53 or 51 from a lightguide fiber 7 having a concentric coating 6 of silicone material. The pattern has first and second outboard regions of interference fringes 61 and 62, respectively on either side of the light intensity of the illuminating beam which is centered about the vertical axis (i.e., $\theta = 0°$). It has been discovered that the period of the interference fringes 61 and 62 depends upon the magnitude and orientation of the eccentricity of the fiber 7 with respect to the incident laser beam 50 or 52, as well as the diameter of the fiber, thickness of the coating 6, the wavelength of the laser light and the refractive indices of the fiber and coating materials. Thus, when the period of the first and second interference fringes are equal, the fiber 7 is centered within its coating 6 in the plane that is being monitored. However, when the periods are not equal the fiber 7 is eccentrically located within its coating 6 which requires that an adjustment be made to applicator 14.

Figure 5:
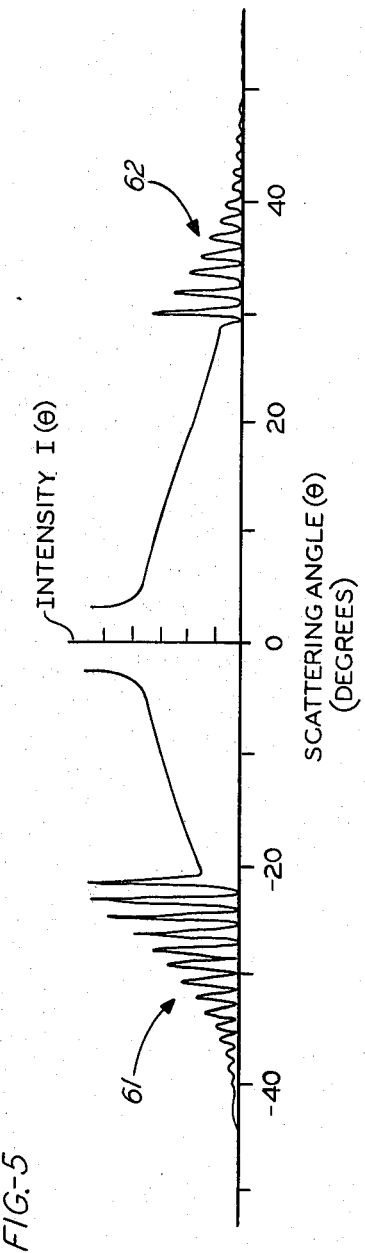

FIG. 5 is the envelope of the video output of the CCTV camera 38 or 39 which represents the forward scattered light intensity pattern 53 or 51 from a coated lightguide fiber 5 that is eccentrically coated with silicone material

SIGNAL PROCESSOR

Figure 6:
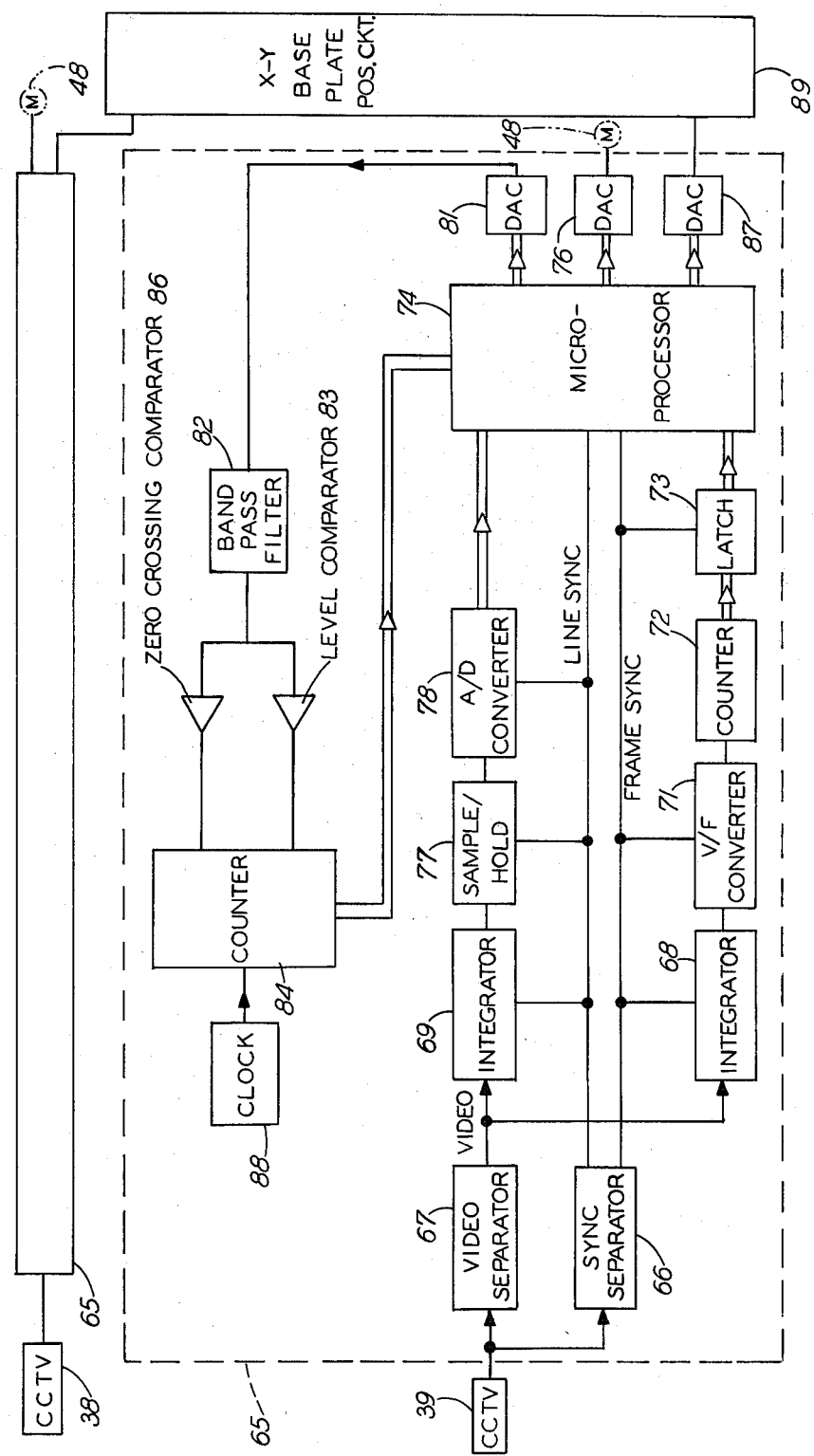
FIG. 6 is a block diagram of signal processing circuitry incorporating aspects of the instant invention.

FIG. 6 is a block diagram of signal processing circuits 65–65 for the video output signal of the CCTV cameras 38 and 39. The processing of the video output signal of the TV camera 38 is identical to that of the TV camera 39 and is not shown in detail for purposes of clarity.

The video output signal from the CCTV camera 39 is separated into frame and line sync pulses by a sync separator circuit 66 and video intensity information by a video separator circuit 67. The line and frame sync pulses are used for synchronization and timing purposes within the signal processing circuit 65. The video signal is input to first and second integrator circuits 68 and 69, respectively. The first integrator 68 sums the area under the intensity spikes of all video signals contained in one complete frame. The output voltage from the first integrator 68, at the end of each frame is proportional to the signal strength (i.e., energy) contained in the forward scattered pattern 51. This integrated voltage level is input to a voltage-to-frequency converter 71 having an output which is gated and applied as a clock to a counter 72 for a predetermined period of time just prior to the end of the field (vertical sync) pulse. Eight bits of binary data from the counter 72 are parallel loaded into a latching circuit 73. The binary data represents the signal strength and is forwarded to a Motorola M6800 microprocessor 74 for further processing as will hereinafter be described. After the binary data is loaded into the latching circuit 73 the integrator 68 and counter 72 are reset by a timing pulse generated by the sync separator circuit 66 (frame sync) preparing the circuits for the next vertical field. The update rate of the circuit is the vertical field scan rate which is equal to the line frequency (60 Hz).

To preclude misalignment of the coating applicator 14 and the subsequent operator judgment required to align the laser beams 50 and 52, the rotatable cube 46, mounted on the shaft of the motor 48 is located in each optical path as hereinbefore described. Rotation of the 2.54 cm square cubes 46 laterally translates the position of the beams 50 or 52 up to 12 mm. An apertured plate (not shown) may be placed between the cube 46 and the viewing screen 36 to reduce the scan range to 5 mm. Such an apertured plate eliminates scattering effects from the corners of the cube 46 from the viewing screens 36 and 37, and defines a small region within which the coated fiber 5 must appear.

The aforementioned signal strength information, transferred from the latching circuit 73 to the microprocessor 74, is used to determine the position of the beam 50 with respect to the coated fiber 5. The beam 50 is slowly scanned across the coated fiber 5 by rotating the cube 46 and the signal strength is continuously examined in the microprocessor 74 for a maximum value. The movement of the cube 46 is controlled by a digital output from the microprocessor 74 to a DAC 76 which outputs an analog voltage to the motor 48 to control the operation thereof. When a maximum has been detected, the beam 50 is past its optimum point, so the rotation of the cube 46 is reversed until the signal strength is brought back to the maximum measured signal strength value. At this time the rotation of the cube 46 is stopped and the beam 50 is effectively centered on the coated fiber 5.

The second integrator 69 sums the video signals contained in each horizontal scan line. The output voltage of the second integrator 69 drives a sample hold circuit 77, controlled by the line sync pulses, whose output is a serialized boxcar representation of the envelope of the forward scattered pattern 51. A digital representation of the envelope is input to the microprocessor 74 through an A/D converter 78 at the horizontal line sample period of 63 $\mu$sec. The envelope representation is stored in the microprocessor 74 as a data list in memory consisting of 256 bytes.

Typically there are three to seven samples per fringe period. This rate exceeds the Nyquist rate, permitting reconstruction of the fringe pattern for more accurate analysis. Since the period of the fringe pattern is the only parameter of importance, the fundamental frequency component only need be reconstructed.

Digital data corresponding to positive scattering angles is forwarded to a digital-to-analog converter (DAC) 81 which outputs the analog fringe information 62 (see FIG. 7) to a one-octave bandpass filter 82 with 42 db/octave roll off. Line sync pulses are used to time the output $I(\theta)$ from the DAC 81. The output of the filter 82 consists of two bursts of near-sinusoidal signal 62a as shown in FIG. 8. The first burst results from ringing on the leading edge of the $I(\theta)$ signal (FIG. 7), which is a step function. The second burst corresponds to the reconstructed interference fringe pattern 62. The bandpass filtered signal is input to a level comparator 83 which times out and rejects the first burst. Additionally, the initial low amplitude transient ringing from the second burst is also rejected by the comparator 83.

The level comparator 83 enables a first counter circuit in circuit 84 which counts four zero crossings of the bandpass filtered signal. During the time when the zero crossings are counted a 250 Khz clock 88 is gated into a second counter in circuit 84. The output of the second counter, which is proportional to the period $P_1$ of the interference fringe 62, is input to the microprocessor 74.

The output of $I(\theta)$ into the DAC81, its analog processing, and the reading of fringe period into the microprocessor 74 are accomplished within the time period of one television frame. During the following frame, the signal $I(-\theta)$ is output to the DAC81, processed and the period $P_2$ of its interference fringe 61 input in a similar fashion. Note that in FIG. 7 the left wing fringe pattern is time reversed such that the bandpass filter 82 generates identical transient signals, and the "period counting" circuitry processes the fringes 61 and 62 in the same manner.

The microprocessor 74 computes a measure of eccentricity based upon the difference between the two period measurements. The eccentricity measure is a monotonic function of fiber offset normal to the laser beam 50. Similar measurements along two orthogonal directions, by both signal processing circuits 65—65, result in a unique measure of fiber eccentricity. The eccentricity signal is forwarded from the microprocessor 74 to a second DAC 87 which, in turn, forwards an analog signal to the X-Y baseplate position circuit 89 to move the baseplate 11 which adjusts the position of the applicator 14 to center the fiber 7 therein.

Fiber positioning is controlled by a deadband control algorithm, where for an eccentricity, e, measured in "counts,"

$$e = \text{period}^+ - \text{period}^- \tag{1}$$

the control, u, is:

$$\begin{aligned} u &= 0 & -1 \leq e \leq 1 \\ u &= u_o & e > 0 \\ u &= -u_o & e < -1 \end{aligned} \tag{2}$$

The value of $u_o$ has been empirically determined as large enough to overcome friction and hysteresis in the motors 48—48 and transport mechanism, yet small enough to account for the slow dynamic response of the fiber 7 moving through the coating material 16. The deadband about the point of pattern symmetry prevents the servo motor control from constantly responding to small disturbances resulting from short term fluctuations in eccentricity or single quantum steps in the computation of the eccentricity function.

The resolution of the system is determined by the number of clock pulses within each period. This in turn depends upon placement of the viewing screen and nominal fiber parameters. For the screen located 3.8 cm from the fiber, the measurement resolution is approximately 0.06°/count. For a 110 $\mu$m fiber with a 220 $\mu$m coating, this corresponds to a resolution on eccentricity of $e = 0.6$ $\mu$m/count. With the deadband controller previously described, the average eccentricity is controlled within $\pm 2e = \pm 1.2$ $\mu$m.

In a particular embodiment a lightguide fiber 7 having a refractive index of 1.457 and a nominal diameter of 110 $\mu$m and a standard deviation of 0.3 $\mu$m was coated. The silicone coating was Dow Sylgard 184 material with a refractive index of 1.40. One kilometer of the fiber 7 was drawn with the coating centering control herein described. Several cross-sections were examined in the microscope through a filar eyepiece. The coating diameter was measured as 230±4 $\mu$m. The offset between the axes of the fiber and coating was measured to be 1.2 $\mu$m±0.5 $\mu$m.

It is to be understood that the embodiments described herein are merely illustrative of the principles of the invention. Various modifications may be made thereto by persons skilled in the art which will embody the principles of the invention and will fall within the spirit and scope thereof.

What is claimed is:

1. A method of automatically centering a lightguide fiber in a light transmissive coating material having an index of refraction lower than that of the fiber, comprising the steps of:
   (a) directing a light beam at the coated fiber to cause a forward scattered light intensity pattern to impinge on a screen, the pattern having a high intensity central peak and a first and second outboard interference fringes;
   (b) monitoring the forward scattered light pattern to determine the period of each of the first and second outboard interference fringes; and
   (c) comparing the period of the fringes to determine the eccentricity of the fiber within the coating in a plane normal to the light beam.

2. The method as set forth in claim 1, comprising the steps of:
   continuously passing the fiber through an applicator having the coating material therein to apply the coating thereto; and
   adjusting the position of the applicator in response to the eccentricity of the fiber within the coating as determined in step (c) to center the fiber within the coating in said plane.

3. A method of automatically centering a lightguide fiber in a light transmissive coating material having an index of refraction lower than that of the fiber, comprising the steps of:
   (a) passing the fiber through an applicator having the coating material therein;
   (b) directing a light beam at the coated fiber to cause a forward scattered light pattern to impinge on a screen;
   (c) monitoring the forward scattered light pattern with a TV camera, the camera generating a video output representing the light intensity of said pattern;

(d) converting the video output into an envelope signal representative of the intensity amplitude of the scattered light intensity pattern, the envelope signal having first and second outboard interference fringes with a high intensity central peak;

(e) determining the period of the first and second outboard fringes associated with the envelope of the video output;

(f) comparing periods of the first and second outboard fringes determined in step (e), the difference being the eccentricity of the fiber within the coating in a plane normal to the light beam;

(g) generating an analog electrical signal proportional to the fiber eccentricity determined in step (f); and (h) adjusting the position of the applicator in response to the analog signals generated in step (g) to center the fiber in the coating in said plane.

4. A method of automatically centering a lightguide fiber in a light transmissive coating material having an index of refraction lower than that of the fiber, comprising the steps of:

(a) passing the fiber through an applicator having the coating material therein;

(b) directing first and second orthogonal light beams at the coated fiber to cause first and second forward scattered light patterns to impinge on a screen;

(c) monitoring the first and second forward scattered light patterns with first and second TV cameras, respectively, each camera generating a video output representing the light intensity of said respective patterns;

(d) converting each video output into first and second envelope signals representative of the intensity amplitudes of the first and second scattered light intensity patterns, the envelope signals each having first and second outboard interference fringes with a high intensity central peak;

(e) determining the period of the first and second outboard fringes associated with the envelope signal of each video output;

(f) comparing periods of the first and second outboard fringes determined in step (e), the difference being the eccentricity of the fiber within the coating in a first and second radially orthogonal direction;

(g) generating first and second analog electrical signal proportional to the fiber eccentricity determined in step (f); and (h) adjusting the position of the applicator in response to the analog signals generated in step (g) to center the fiber in the coating.

5. An apparatus for automatically centering a lightguide fiber in a light transmissive coating material having an index of refraction lower than that of the fiber, comprising:

(a) means for directing a light beam at the coated fiber to cause a forward scattered light intensity pattern to impinge on a screen; the pattern having a high intensity central peak and a first and second lower intensity outboard interference fringes;

(b) means for monitoring the forward scattered light intensity pattern to determine the period of each of the first and second outboard interference fringes; and (c) means for comparing the period of the first fringe to the period of the second fringe to determine the eccentricity of the fiber within the coating in a plane normal to the light beam.

6. The apparatus as set forth in claim 5, comprising:

means for continuously passing the fiber through an applicator having the coating material therein to apply the coating thereto; and means for adjusting the position of the applicator in response to the eccentricity of the fiber within the coating to center the fiber within the coating in said plane.

7. An apparatus for automatically centering a lightguide fiber in a light transmissive coating material having an index of refraction lower than that of the fiber, comprising:

(a) means for passing the fiber through an applicator having the coating material therein;

(b) means for directing a light beam at the coated fiber to cause a forward scattered light pattern to impinge on a screen;

(c) means for monitoring the forward scattered light pattern with a TV camera, the camera generating a video output representing the light intensity of said pattern;

(d) means for converting the video output into an envelope signal representative of the intensity amplitude of the scattered light intensity pattern, the envelope signal having first and second outboard fringes with a high intensity central peak;

(e) means for determining the period of the first and second outboard fringes associated with the envelope signal of the video output;

(f) means for comparing periods of the first and second outboard fringes, the difference being the eccentricity of the fiber within the coating in a plane normal to the light beam;

(g) generating an analog electrical signal proportional to said fiber eccentricity; and (h) adjusting the position of the applicator in response to said analog signals to center the fiber in the coating in said plane.

8. Apparatus for automatically centering a lightguide fiber in a light transmissive coating material having an index of refraction lower than that of the fiber, comprising:

means for passing the fiber through an applicator having the coating material therein;

means for directing first and second orthogonal light beams at the coated fiber to cause first and second forward scattered light patterns to impinge on a screen;

means for monitoring the first and second forward scattered light patterns with first and second TV cameras, respectively, each camera generating a video output representing the light intensity of said respective patterns;

means for converting each video output into first and second envelope signals representative of the intensity amplitudes of the first and second scattered light intensity patterns, the envelope signals each having first and second outboard fringes with a high intensity central peak;

means for determining the period of the first and second outboard fringes associated with each envelope signal of the video output;

means for comparing periods of the first and second outboard fringes, the difference being the eccentricity of the fiber within the coating in a first and second radially orthogonal direction;

means for generating first and second analog electrical signals proportional to the fiber eccentricity; and means for adjusting the position of the applicator in response to the analog signals to center the fiber in the coating.

9. The apparatus as set forth in claim 5, 6, 7 or 8, wherein:

each screen is light transmissive; and the light intensity pattern is monitored on the side of the screen opposite to the fiber.

* * * * *